US009046597B2

(12) United States Patent
De Coi et al.

(10) Patent No.: US 9,046,597 B2
(45) Date of Patent: Jun. 2, 2015

(54) MONITORING SENSOR WITH ACTIVATION

(75) Inventors: Beat De Coi, Sargans (CH); Tobias Leutenegger, Chur (CH)

(73) Assignee: Cedes AG, Landquart (CH)

( * ) Notice: Subject to any disclaimer, the term of this patent is extended or adjusted under 35 U.S.C. 154(b) by 657 days.

(21) Appl. No.: 13/295,654

(22) Filed: Nov. 14, 2011

(65) Prior Publication Data

US 2012/0150480 A1  Jun. 14, 2012

(30) Foreign Application Priority Data

Nov. 15, 2010 (EP) ..................... 10014615

(51) Int. Cl.
*G01S 17/02* (2006.01)
*G01D 21/00* (2006.01)
(Continued)

(52) U.S. Cl.
CPC ................. *G01S 7/497* (2013.01); *G01S 17/06* (2013.01); *G01D 21/00* (2013.01); *G06F 19/00* (2013.01); *G06F 17/40* (2013.01); *G01S 17/026* (2013.01); *G01S 17/74* (2013.01)

(58) Field of Classification Search
CPC ........... G01D 7/00; G01D 9/00; G01D 18/00; G01D 21/00; G01S 7/00; G01S 7/02; G01S 7/40; G01S 7/48; G01S 7/497; G01S 17/00; G01S 17/02; G01S 17/026; G01S 17/74; G06F 11/00; G06F 11/30; G06F 11/32; G06F 11/34; G06F 15/00; G06F 15/16; G06F 17/00; G06F 17/10; G06F 17/40; G06F 19/00
USPC .............. 73/1.01, 432.1, 865.8, 865.9, 866.3; 327/1, 18, 50; 702/1, 85, 104, 108, 702/116, 127, 182; 708/100, 200; 713/300, 713/310
See application file for complete search history.

(56) References Cited

U.S. PATENT DOCUMENTS

| 4,752,768 A | 6/1988 | Steers et al. |
| 5,675,150 A | 10/1997 | Kunz |

(Continued)

FOREIGN PATENT DOCUMENTS

| CN | 101189645 A | 5/2008 |
| DE | 10 2007 025 373 B3 | 7/2008 |

(Continued)

OTHER PUBLICATIONS

Timo Kahlmann, et al., "Calibration of the Fast Range Imaging Camera SwissRanger™ for the Use in the Surveillance of the Environment," Proceedings of SPIE, vol. 6396, Jan. 1, 2006, pp. 639605-1 to 639605-12.

(Continued)

*Primary Examiner* — Edward Cosimano
(74) *Attorney, Agent, or Firm* — Burr & Brown, PLLC

(57) ABSTRACT

A monitoring sensor for detecting a test signal from an external signal generator at an input for receiving signals, to switch the monitoring sensor from a passive state to an active state when a signal is detected, to switch the monitoring sensor to a test state after a test period "t2" has expired, to change an output signal from an output of the monitoring sensor after an activation period "t3" has expired, this change in the output signal corresponding to a signal which arises when the monitoring sensor triggers a switching operation after an object has been detected, to convert the output signal to the initial state again after the withdrawal of the test signal has been detected, and to provide this renewed signal change as the signal for an external signal generator, the monitoring sensor changing to the monitoring state after this signal sequence.

7 Claims, 2 Drawing Sheets

(51) Int. Cl.
  *G06F 17/40* (2006.01)
  *G06F 19/00* (2011.01)
  *G01S 7/497* (2006.01)
  *G01S 17/06* (2006.01)
  *G01S 17/74* (2006.01)

(56) References Cited

U.S. PATENT DOCUMENTS 7,987,389 B2* 7/2011 Lai .................................. 714/32
2004/0212678 A1* 10/2004 Cooper et al. ................ 348/155
2009/0212943 A1 8/2009 Burnard et al.
2010/0007870 A1 1/2010 Haberer et al.
2011/0066888 A1* 3/2011 Lai .................................. 714/32

FOREIGN PATENT DOCUMENTS

DE    10 2008 032 216 A1    1/2010
EP         1 933 167 A2    6/2008

OTHER PUBLICATIONS

Chinese Office Action (With English Translation), Chinese Application No. 201 110445606.2, dated Jan. 12, 2015 (11 pages).

* cited by examiner

MONITORING SENSOR WITH ACTIVATION

This application claims the benefit under 35 USC §119(a)-(d) of European Application No. 10 014 615.8 filed Nov. 15, 2010, the entirety of which is incorporated herein by reference.

FIELD OF THE INVENTION

The present invention relates to a monitoring sensor for monitoring a monitoring area, in particular an area of a room in the opening area of a door.

BACKGROUND OF THE INVENTION

In order to increase the operational reliability of doors and/or gates which can be opened automatically, it is known to use commercially available monitoring sensors which signal a potential dangerous situation when an object is detected in a danger zone caused by the movement of the door to be opened and/or of the gate to be opened.

SUMMARY OF THE INVENTION

The invention is based on the object of improving a monitoring sensor according to the prior art mentioned in the introduction.

The present invention accordingly relates to a monitoring sensor for monitoring a monitoring area, in particular an area of a room in the opening area of a door, a gate or a window. The monitoring sensor may comprise, in particular, a transmitting device which emits radiation, in particular electromagnetic radiation, and a receiving device for detecting radiation, in particular reflected radiation emitted by the transmitting device, the monitoring sensor preferably being able to detect objects in the monitoring area using the detected radiation and, in particular, to also determine the distance between the objects and the monitoring sensor. Means for carrying out a functional test for at least one monitoring sensor component may additionally be provided.

The monitoring sensor is distinguished by the fact that it is designed to detect a test signal from an external signal generator at an input for receiving signals, and to switch the monitoring sensor from a passive state to an active state when a signal is detected, and to switch the monitoring sensor to a test state after an activation period "t2" has expired, and to change an output signal from an output of the monitoring sensor after a test period "t3" has expired, this change in the output signal corresponding to a signal which arises when the monitoring sensor triggers a switching operation after an object has been detected, and to convert the output signal to the initial state again after the withdrawal of the test signal has been detected, and to provide this renewed signal change as the signal for an external signal generator, the monitoring sensor changing to the monitoring state after this signal sequence.

This makes it possible to considerably reduce the energy consumption for the relevant monitoring sensor to the effect that, during times in which it is not necessary to monitor the monitoring area, the monitoring sensor also does not carry out such monitoring and saves the energy which is otherwise required for this purpose. This is particularly advantageous for those monitoring sensors which are wireless, for example, and have autonomous energy sources such as batteries, rechargeable batteries or the like.

In addition, this also makes it possible to extend the service life on account of a considerably reduced total operating time for active operation of the monitoring sensor, in particular of its components which generate waste heat.

As a result of the proposed monitoring sensor design, the monitoring sensor can nevertheless be used at any time for superordinate control, for example for door control, as a test unit for signaling purposes, and can signal whether, as a result of operation of the movement element required for actuation (door, gate, window or the like), an object in this movement area or in the vicinity of the latter is possibly at risk.

With regard to saving energy and/or extending the service life of the monitoring sensor, in particular of its thermally loaded components, the monitoring sensor may be advantageously designed to switch from the operational state to a passive state, for example after a particular time has expired and/or if an external signal intended for this purpose is detected.

The monitoring sensor may comprise imaging optics which make it possible to detect objects, for example a CCD chip or the like, for example with a matrix resolution. Such a monitoring sensor may particularly preferably also measure distances in the manner of 3D detection, particularly preferably separately for each individual pixel. This means that, in addition to assessing whether or not an object is detected for each recorded pixel, the distance between the monitoring sensor and the actual item detected by it as a pixel, for example an object or otherwise the floor or a wall for example, can also be additionally determined for each recorded pixel.

Objects in the monitoring area to be monitored by the monitoring sensor can be detected, in particular, by the transmitting device being caused to emit radiation, for example by a control unit assigned to it, for example in the form of a processor. With the correct method of operation of the transmitting device, for example a transmitting element which emits electromagnetic and/or acoustic radiation, the transmitting device emits corresponding radiation, preferably directly in the direction of the area of the room to be monitored. In accordance with the reflection properties of the surfaces to which this emitted radiation is applied, for example the floor, walls and, in particular, objects, a corresponding proportion of the impinging radiation may be reflected by the surfaces, in particular even back in the direction of the receiving device belonging to the monitoring sensor, in order to detect radiation. With a correctly operating receiving device, this receiving device can evaluate the reflected radiation.

In one preferred embodiment, the monitoring sensor may operate in the infrared wavelength range, particularly preferably with pulsed infrared light. This has the advantage that the monitoring sensor can be covered, for example, with infrared-transmissive plastic and can thus be protected against external influences, with the result that long-term stable operation of such a monitoring sensor is possible even in installation areas which are possibly more severely affected by environmental influences. Pulsed operation makes it possible to further reduce the total power and, in particular, the power loss predominantly occurring as waste heat, for example in comparison with a monitoring sensor which is permanently operated.

The basis for determining the distance of the individual image acquisition points may be, for example, a so-called "time-of-flight" (TOF) method in which the propagation time of a modulated signal is used to determine the distance. In a modified embodiment, however, a phase difference may also be measured for this purpose.

Further preferred embodiments of such a monitoring sensor may comprise, for example, one or more light barriers. These light barriers may form, for example, a light curtain and/or a light grid in order to implement corresponding safety functions, for example. This makes it possible to monitor larger transition areas and/or passage areas, for example.

In a further preferred embodiment, the monitoring sensor may also comprise an identification means reading unit. This makes it possible to implement access control, for example.

In a furthermore preferred embodiment, provision may be made of an evaluation arrangement which is designed to check a component and/or a signal of the monitoring sensor, in particular a signal from the receiving device, for plausibility on the basis of receiving activity during transmitting operation and/or to check a signal from the transmitting device for plausibility.

In this case, plausibility is understood, on the one hand, as meaning that a check is carried out in order to determine whether a signal which can be expected in the corresponding operating state of the monitoring sensor can be detected at all in that manner at the component to be tested. On the other hand, the check in order to determine whether the value for a possibly detected signal is in an expected range of values is also understood in the sense of the claimed plausibility check.

The signal to be checked is understood, according to the invention, as meaning both input signals and output signals of the monitoring sensor components to be tested, for example an electrical potential, which would have to be applied between two circuit points on account of the relevant operating voltage being supplied, and/or by generating a potential difference between two circuit points as the response of a monitoring sensor element to action on the latter, for example the application of radiation to a photoelectric element and/or to an element which records acoustics. An electrical current which flows in a particular circuit area, for example through a connection point of a monitoring sensor element or the like, is also understood as meaning a signal in this sense.

Radiation emitted by the transmitting device and/or other radiation coming from sources other than the monitoring sensor source or signals of this type which are generated by a monitoring sensor component on account of appropriate actuation, for example with the application of the required operating voltage, is/are also understood as meaning signals. In addition to electromagnetic radiation, any other radiation, for example acoustic radiation, is also understood in this case.

In a further preferred embodiment, the monitoring sensor may be designed to detect a modification signal at an input for receiving signals from an external signal generator, and to switch the monitoring sensor from a passive state to an active state when a signal is detected, and to switch the monitoring sensor to a modification state after the activation period has expired, and to carry out modifications to the circuit of the monitoring sensor after the activation period has expired, and/or to provide data at an output of the monitoring sensor for an external receiver.

As a result, the monitoring sensor can react to parameters, for example on the request of an external control unit, and/or can also change these parameters if necessary. Modifications to the circuit of the monitoring sensor, for example to a software program, are also possible, for example. However, this may also make it possible to deal with possibly identified problems. In a simple case, a restart of the monitoring sensor may be initiated in this case if necessary, and, depending on the complexity of the identified fault, it may be possible to install a new program if necessary.

In a further advantageous manner, the monitoring sensor may comprise a control unit which can be used to control at least parts of the components of the monitoring sensor. The monitoring sensor may preferably also comprise two control units which, for example, can share the control of individual subassemblies, for example the transmitting unit and the receiving unit. In a further advantageous manner, the remaining transmitting and receiving components described above may also be controlled by one or the other of these two control units and/or may also be controlled by both control units.

BRIEF DESCRIPTION OF THE DRAWINGS

Exemplary embodiments are described below with reference to the accompanying figures.

DETAILED DESCRIPTION OF THE INVENTION

Figure 1:
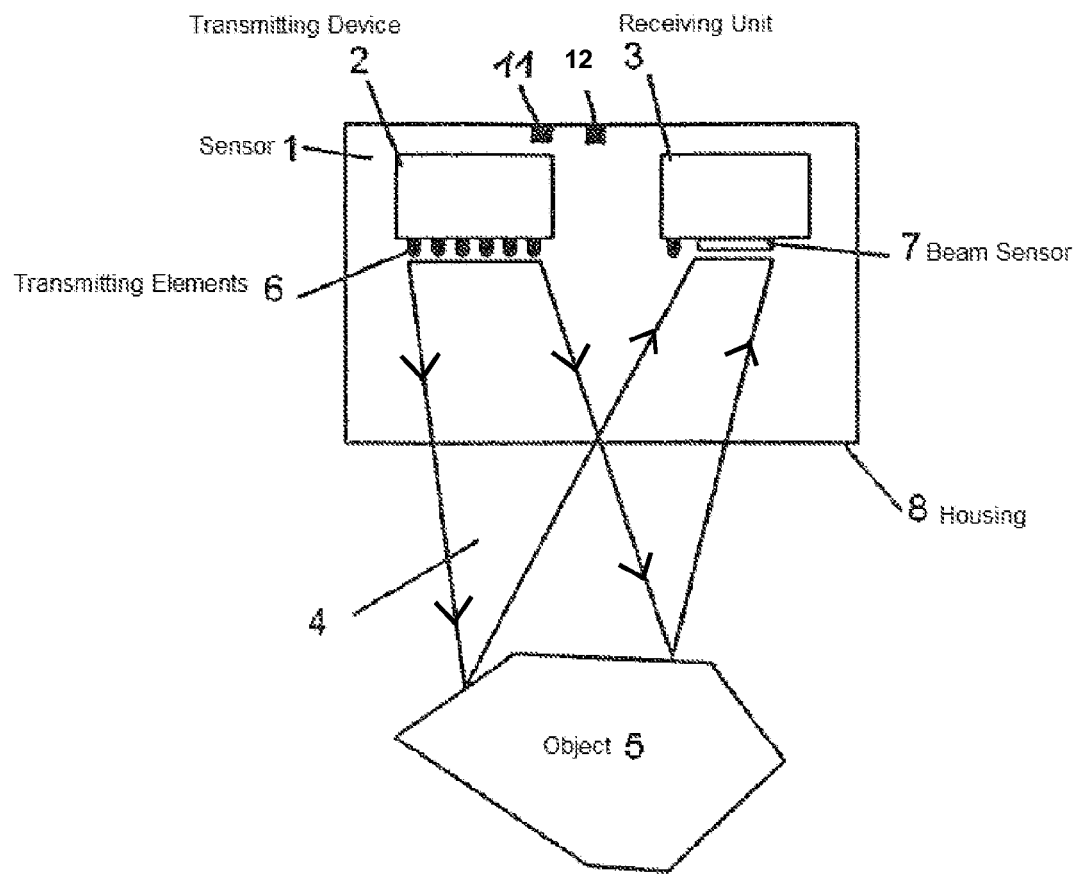
FIGS. 1 and 2 schematically show two possible embodiments of a monitoring sensor according to the invention in a purely exemplary manner.

FIG. 1 accordingly shows a monitoring sensor 1 for monitoring a monitoring area, in particular an area of a room in the opening area of a door. The monitoring area is understood as meaning, in particular, any area in which objects (persons, animals and/or items, etc.) may be at risk as a result of movement of a driven closing apparatus, for example a door, a gate, a window or the like.

In order to be able to detect an object 5 which possibly enters the area of the room to be monitored and/or is present therein, the monitoring sensor 1 is provided with a transmitting device 2. In the exemplary embodiment illustrated, this transmitting device 2 comprises, by way of example, six individual transmitting elements 6, for example in the form of transmitting LEDs. These may operate in the infrared range, for example. The beam cones 4 emitted by the transmitting elements 6 are reflected back to the monitoring sensor 1 and to a receiving unit 3 associated with the monitoring sensor 1 by the surface of an object (illustrated by way of example here).

The receiving unit 3 comprises a beam sensor 7 having individual beam receiving elements which are arranged, for example, in the form of a matrix, thus enabling imaging scene acquisition for the monitoring area to be monitored. This beam sensor 7 may be particularly advantageously designed in such a manner that, for each individual pixel, it can also determine the distance between it and the surface at which the radiation emitted by the transmitting device 2 was reflected. In addition to the presence of an object 5 which is possibly in the area of the room to be monitored, it is thus also possible to determine the distance between the object 5 and the door sensor in the manner of 3D detection.

The basis for determining the distance of the individual image acquisition points may be, for example, a so-called "time-of-flight" (TOF) method which is implemented using a so-called TOF sensor. In this case, the propagation time of a modulated signal is used to determine the distance. In particular, the propagation time may be obtained by measuring a phase difference.

In order to protect the individual sensor components, the monitoring sensor 1 may comprise a housing 8 which particularly advantageously transmits the radiation emitted by the transmitting elements 6.

In order to communicate with the outside, the monitoring sensor 1 may also have an input 11 and an output 12, for example in the form of wired connections. These may be in the form of wire connections, optocouplers or other such connections for signal inputs and/or signal outputs, for example.

Figure 2:
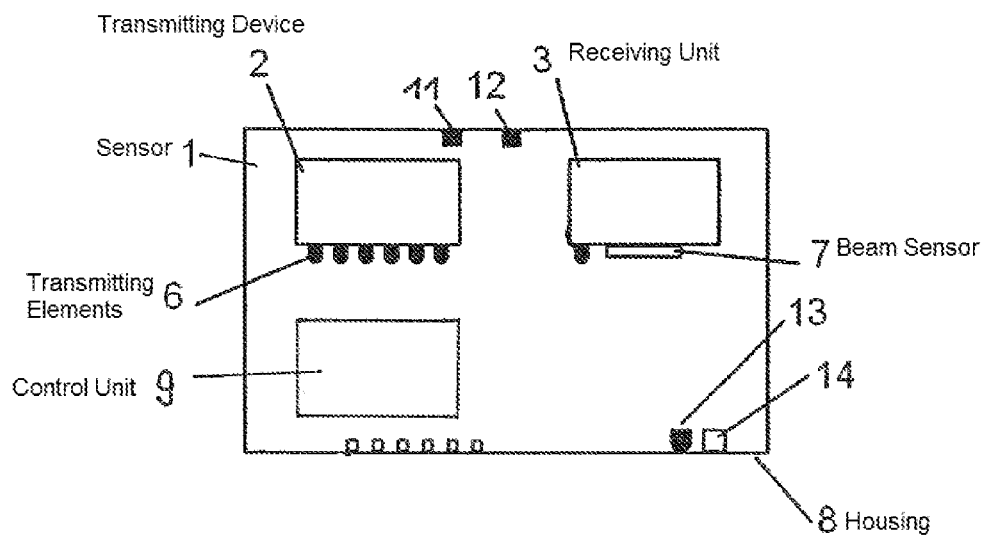

As a superordinate entity, the monitoring sensor 1 may also comprise a control unit 9 (FIG. 2). A circuit which can be used to query signals 11.1 (FIG. 3) applied to the input 11 in order to trigger a response in the monitoring sensor 1 on the basis thereof may be arranged in the control unit 9, for example. A connection to the output 12 may also be provided in order to apply, for example, an output signal 12.1 to the latter, for example in order to transmit an item of information to an external, for example superordinate entity, for example a door and/or gate controller.

As an alternative communication option, a wireless sensor input 13 and a wireless output 14 for receiving a signal from an external signal unit and for transmitting an output signal to such an external unit may be provided, for example. For the sake of simplicity, these two signals are likewise described with 11.1 and 12.1 below.

The response of the monitoring sensor 1 when an input signal 11.1 is detected may be, for example, activation from a passive state to an active state. The state may be followed by a test state in which components and/or signals can be checked for plausibility.

Additionally and/or alternatively, a modification signal may be transmitted to the monitoring sensor 1 in a corresponding manner, whereupon the monitoring sensor 1 switches to a modification state, for example. Corresponding changes at the inputs 11, 13 and at the outputs 12, 14 may also be provided for the purpose.

Figure 3:
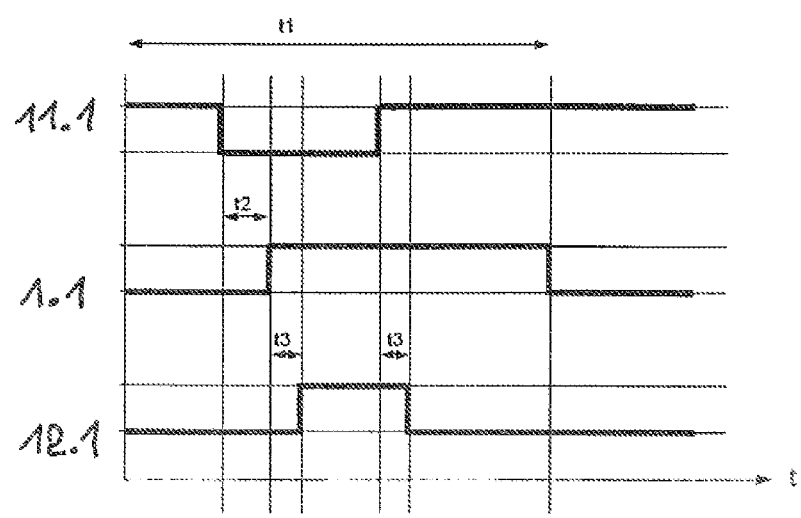
FIG. 3 shows a switching diagram.

The following applies to the signal profile according to FIG. 3: as soon as a request is detected via a level change at the input 11 and/or 13, the monitoring sensor 1 can change over to an active state and, after an activation period has expired, can switch to a test state in which it carries out the test operations described above. After the activation period required for this purpose has expired, the monitoring sensor 1 can change a signal applied to its output 12 and/or 14, this change in the output signal corresponding to a signal which arises when the monitoring sensor 1 triggers a switching operation after an object has been detected. After withdrawal of the signal applied to the input 11 and/or 13 has been detected, the monitoring sensor 1 can then convert the signal applied to the output back to the initial state again, this renewed signal change being available as a signal for an external signal generator, and the monitoring sensor 1 changing to the operating state after this signal sequence. For the signal profiles illustrated by way of example in FIG. 3, the signal 11.1 corresponds to the signal from an external unit, which is applied to the input 11 or 13, the signal 1.1 corresponds to the "passive" state of the monitoring sensor 1 and its return to the "passive" state again after it has changed to the "active" state and after a time "t1" has expired, and the signal 12.1 is the output signal from the monitoring sensor 1 which is applied to the output 12 and/or 14.

The monitoring sensor 1 can be reset to a so-called quiescent state again after one of a particular time has expired and following signaling via an input signal 11.1 at one of an input 11 and/or 13.

As a result, during a time in which there is no need to monitor the monitoring area to be monitored, the monitoring sensor 1 is able to switch to an energy-saving so-called quiescent mode which extends the service life of the monitoring sensor 1, in particular of individual components such as its transmitting elements 6.

The transmitting elements 6 and the beam sensor 7 may also function as a light barrier, for example. In the illustration in FIG. 1, this may be a light barrier which is effective over a reflection surface, for example. On account of the plurality of transmitting elements and beam receiving elements, it is thus also possible to implement a so-called light curtain or light grid.

The wireless sensor input 13 and output 14 may also be used to implement an identification means reading unit, for example. This would likewise make it possible to emit electromagnetic radiation by means of the wireless output 14 and, with corresponding feedback to the wireless sensor input 13, to check whether there is access authorization, for example.

LIST OF REFERENCE SYMBOLS

1 Monitoring sensor
2 Transmitting device
3 Receiving Unit
4 Beam Cone
5 Object
6 Transmitting Element (LEDs)
7 Beam Sensor (may include TOF chip)
8 Housing
9 Control unit
11 Input
12 Output
13 Wireless Sensor Input
14 Wireless Output

We claim:

1. A monitoring sensor for monitoring a monitoring area, wherein the monitoring sensor is configured to apply an output signal at an output in order to transmit a piece of information, and after the detection of an object, to change the signal applied at the output and trigger a switching process, wherein the monitoring sensor is configured to detect a test signal, comprising a level change, of an external signal generator at an input for receiving signals, and to switch the monitoring sensor from a passive state to an active state when a signal is detected, and to switch the monitoring sensor to a test state after an activation period has expired for activating from the passive to the active state, and to change an output signal of an output of the monitoring sensor after a subsequent test period has expired, this change in the output signal corresponding to a signal which occurs when the monitoring sensor triggers a switching process after an object has been detected, and to convert the output signal back to the initial state after the withdrawal of the test signal has been detected, and to provide this renewed signal change as the signal for the external signal generator, the monitoring sensor changing to the monitoring state after this signal sequence.

2. A monitoring sensor according to claim 1, wherein the monitoring sensor comprises a 3D sensor.

3. A monitoring sensor according to claim 1, wherein the monitoring sensor comprises at least one light barrier.

4. A monitoring sensor according to claim 1, wherein the monitoring sensor comprises an identification means reading unit.

5. A monitoring sensor according to claim 1, wherein a plausibility check is carried out during the test state for a signal from the receiving device on the basis of receiving activity during transmitting operation and/or for a signal from the transmitting device.

6. A monitoring sensor according to claim 1, wherein the monitoring sensor is designed to switch from the operational state to the passive state.

7. A monitoring sensor according to claim 1, wherein the sensor is a time of flight sensor.

* * * * *